(12) United States Patent
Lagnado et al.

(10) Patent No.: US 8,228,239 B2
(45) Date of Patent: Jul. 24, 2012

(54) HEAT-DISSIPATING WIRELESS COMMUNICATION SYSTEM

(75) Inventors: Isaac Lagnado, Houston, TX (US);
Timothy Neill, Houston, TX (US);
Mark S. Tracy, Houston, TX (US);
Jeffrey A. Lev, Houston, TX (US);
Walter G. Fry, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1220 days.

(21) Appl. No.: 11/344,296

(22) Filed: Jan. 31, 2006

(65) Prior Publication Data

US 2007/0176831 A1    Aug. 2, 2007

(51) Int. Cl.
*H01Q 1/24* (2006.01)
(52) U.S. Cl. ...................................................... 343/702
(58) Field of Classification Search .................. 343/702; 361/687
See application file for complete search history.

(56) References Cited

U.S. PATENT DOCUMENTS

| 5,828,552 | A | 10/1998 | Ma |
| 5,969,946 | A | 10/1999 | Lai et al. |
| 6,339,400 | B1 | 1/2002 | Flint et al. |
| 6,724,348 | B2 | 4/2004 | Fang |
| 7,206,196 | B2 * | 4/2007 | Ghosh et al. .................. 361/683 |
| 2003/0157389 | A1 * | 8/2003 | Kornmayer .................... 429/34 |
| 2004/0257283 | A1 * | 12/2004 | Asano et al. .................. 343/702 |
| 2005/0099228 | A1 | 5/2005 | Akatsuka et al. |

OTHER PUBLICATIONS

State Intellectual Property Office, P.R. China. Decision on Rejection, Appln No. 200710006169.8, date of mailing Mar. 10, 2011, pp. 7.
Translation of State Intellectual Property Office, P.R. China, Decision on Rejection, Appln No. 200710006169.8, date of mailing Mar. 10, 2011, pp. 17.

* cited by examiner

*Primary Examiner* — Jacob Y Choi
*Assistant Examiner* — Robert Karacsony

(57) ABSTRACT

A heat-dissipating wireless communication system for a computer device comprises an antenna configured for wireless communications, the antenna configured to dissipate heat generated by the computer device.

17 Claims, 2 Drawing Sheets

HEAT-DISSIPATING WIRELESS COMMUNICATION SYSTEM

BACKGROUND OF THE INVENTION

Many computers comprise wireless communication devices that generate considerable thermal energy during operation. For example, power amplifiers used in connection with wireless communication systems are employed to transform electrical energy into radio frequency energy for transmission by an antenna. However, power amplifiers generate a substantial amount of thermal energy. As a result, many wireless communication devices are forced to operate at a reduced power level (e.g., by reducing the transmit power) in order to reduce the amount of thermal energy generated. Although the computer device's cooling platform (e.g., the computer's existing cooling system that dissipates heat from other computer components, such as a processor and/or graphics chip) can be used to dissipate the thermal energy from the power amplifier, positioning the power amplifier in the computer device to facilitate use of such cooling platform generally results in reduced performance of the wireless communication device at least based on the separation distance between the power amplifier and the antenna.

BRIEF DESCRIPTION OF THE DRAWINGS

For a more complete understanding of the present invention, and the objects and advantages thereof, reference is now made to the following descriptions taken in connection with the accompanying drawings in which.

DETAILED DESCRIPTION OF THE DRAWINGS

Figure 1:
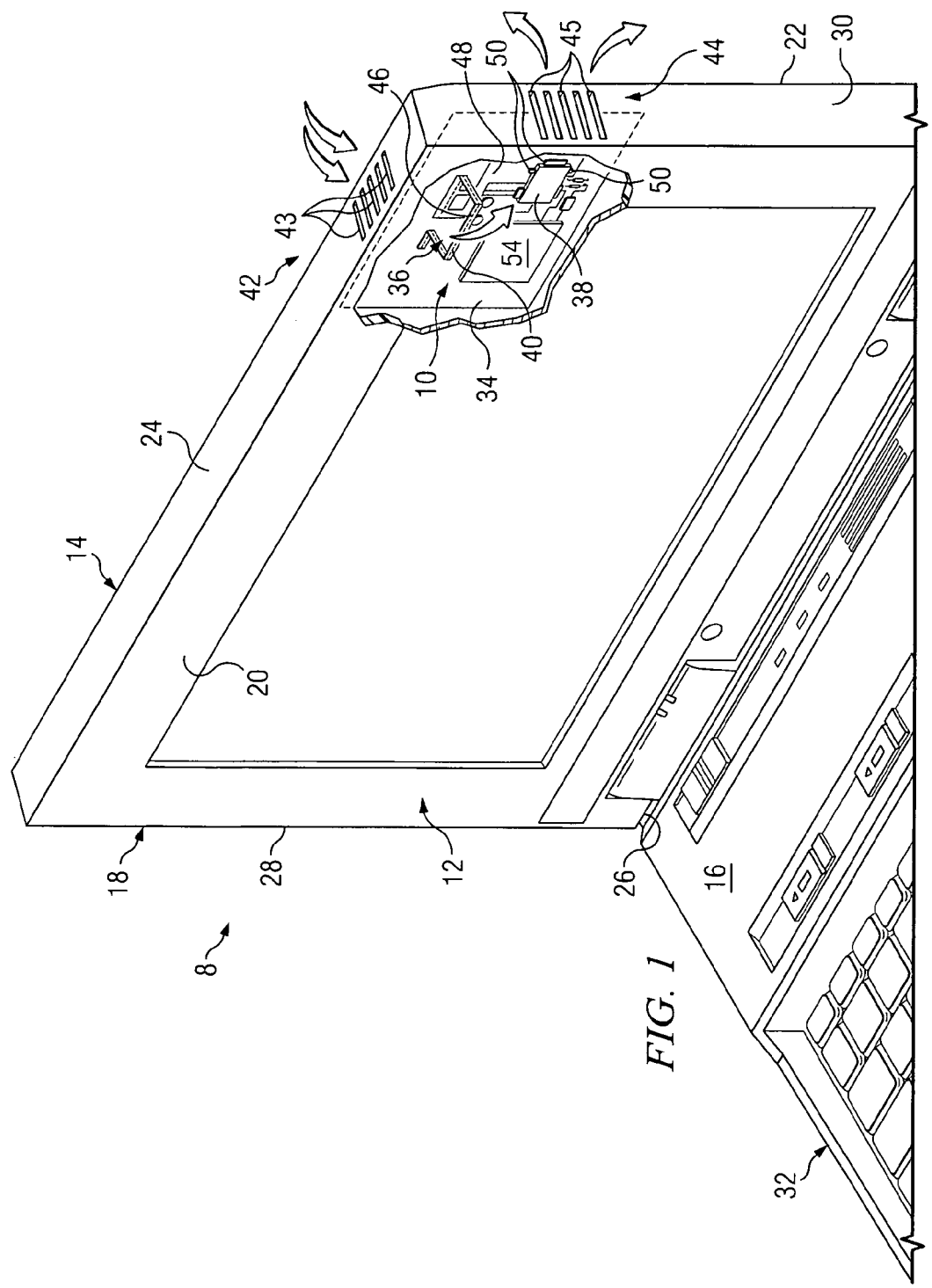
FIG. 1 is a diagram illustrating a computer device in which an embodiment of a heat-dissipating wireless communication system is employed to advantage in accordance with the present invention.
Figure 2:
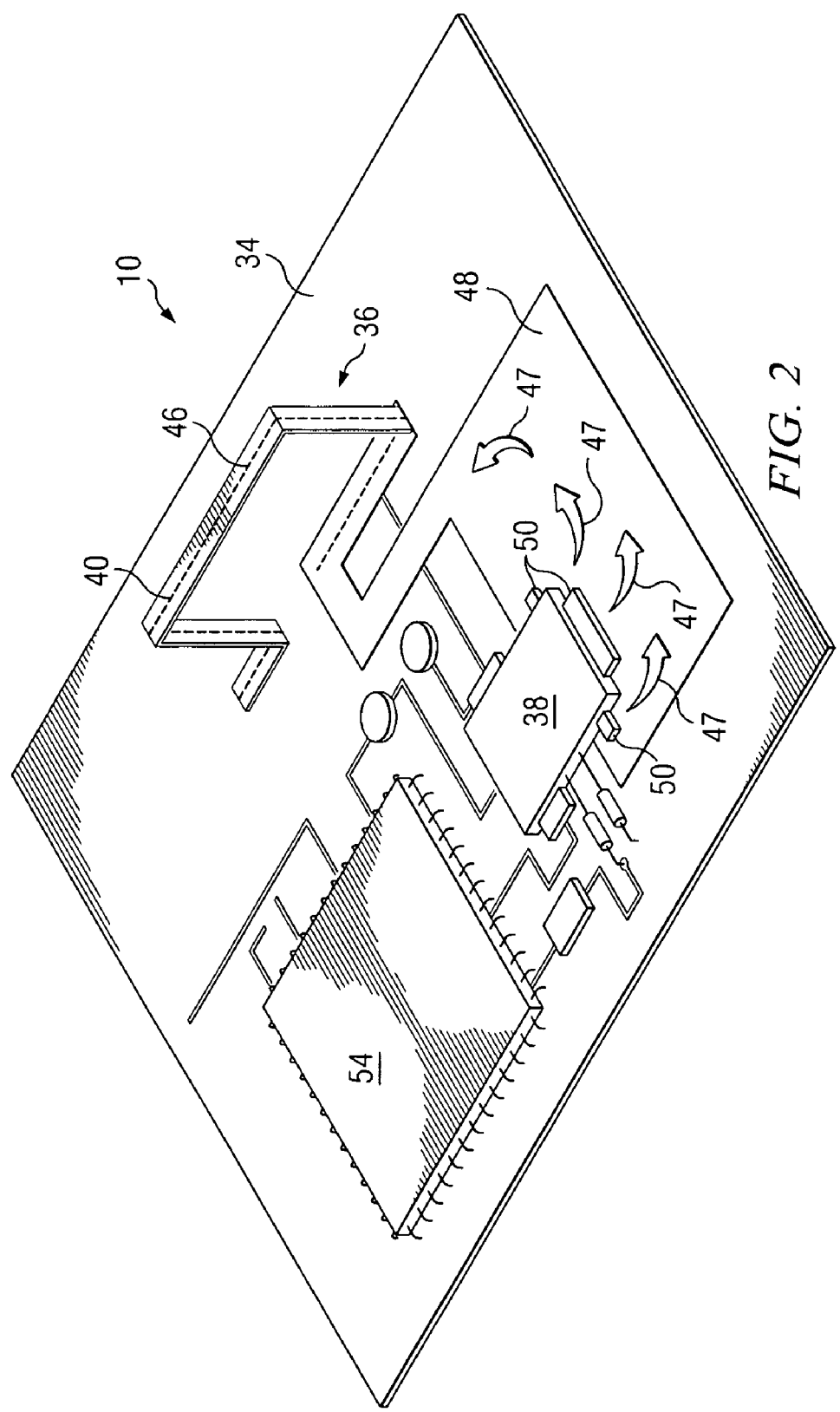
FIG. 2 is a diagram illustrating an enlarged view of the heat-dissipating wireless communication system of FIG. 1.

The preferred embodiments of the present invention and the advantages thereof are best understood by referring to FIGS. 1 and 2 of the drawings, like numerals being used for like and corresponding parts of the various drawings.

FIG. 1 is a diagram of a computer device 8 in which an embodiment of a heat-dissipating wireless communication system 10 is employed to advantage in accordance with the present invention. In the embodiment illustrated in FIG. 1, computer device 8 comprises a laptop or notebook computer 12 comprising a display member 14 rotatably coupled to a base member 16. However, it should be understood that computer device 8 may comprise any type of computer device such as, but not limited to, a desktop computer, a tablet personal computer, a handheld computing device, or any other type of portable or non-portable computer device.

In the embodiment illustrated in FIG. 1, display member 14 comprises a housing 18 having a front surface 20, a rear surface 22, a top surface 24, a bottom surface 26 and a pair of side surfaces 28 and 30. In the illustrated embodiment, heat-dissipating wireless communication system 10 comprises a printed circuit board (PCB) 34 having an antenna 36 communicatively coupled to a power amplifier 38. In the embodiment illustrated in FIG. 1, antenna 36 is a conductive metallic structure and comprises a planar inverted f-antenna 40 (PIFA) disposed on and extending at least partly spaced apart from PCB 34 to reduce the likelihood of any physical obstructions (e.g., other components of system 10 and any other components disposed on PCB 34 or within housing 18) that may block wireless communications by antenna 36; however, it should be understood that antenna 36 may comprise other types of materials, configurations, and antenna types. Power amplifier 38 is configured to deliver and receive radio frequency (RF) signals to and from antenna 36.

In operation, antenna 36 is used to dissipate thermal energy generated by components of system 10 (e.g., by power amplifier 38 and/or any other component(s) of system 10) to reduce and/or eliminate the likelihood of damage to PCB 34, antenna 36, power amplifier 38 and/or any other component(s) that may be disposed within housing 18. It should be understood that computer device 8 may comprise additional component(s) 54 used in combination with or independent of wireless communication system 10, such as, for example, a graphics chip and/or a processor. It should be understood that in addition to or in lieu of thermally coupling power amplifier 38 and/or other components of wireless communication system 10 to antenna 36, component(s) 54 may also be thermally coupled to antenna 36 to dissipate the thermal energy that may be generated thereby. Thus, in operation, antenna 36 is used as a heat exchanger for dissipating thermal energy generated by components of system 10 and/or other components 54 of computer device 8.

In the embodiment illustrated in FIG. 1, wireless communication system 10 is disposed adjacent to vents 42 and 44 formed in and/or otherwise disposed on surfaces 24 and 30, respectively, of housing 18. Each vent 42 and 44 preferably comprises a plurality of openings, 43 and 45, respectively, to enable an airflow through housing 18. In operation, vents 42 and 44 enable dissipation of thermal energy generated by system 10 and/or components 54 disposed within housing 18. Preferably, antenna 36 is disposed within an airflow passing through vents 42 and 44. In FIG. 1, an airflow path is illustrated as entering vent 42 and discharging from vent 44. However, it should be understood that the airflow direction may be reversed. Further, it should be understood that other vents may be formed on device 8 (e.g., at other locations in housing 18) such that an airflow enters housing 18 from both vents 42 and 44 or exits housing 18 from both vents 42 and 44. It should also be understood that vents 42 and 44 may be otherwise located on housing 18, such as on bottom surface 26 and/or side surface 28, by way of example. Further, in FIG. 1, two vents 42 and 44 are illustrated. However, it should be understood that a greater or fewer quantity of vents may be used.

FIG. 2 is a diagram illustrating an enlarged view of system 10 of FIG. 1. In the embodiment illustrated in FIG. 2, antenna 36 comprises an active element 46 for radiating RF signals generated by power amplifier 36 and a ground portion 48. In the embodiment illustrated in FIG. 2, RF signals are communicated to/from active element 46 via a path or trace 45 on PCB 34. In operation, the heat generated by power amplifier 38 is transferred to antenna 36 via a plurality of thermally conductive straps or pads 50, which thermally couple power amplifier 38 to ground portion 48, which in turn is coupled to antenna 36. Pads 50 comprise a thermally conductive material to facilitate the transfer of thermal energy generated by power amplifier 38 to ground portion 48. In FIG. 2, three pads 50 are illustrated; however, it should be understood that a greater or fewer number of pads 50 and/or any other device may be used to thermally couple power amplifier 38 to antenna 36. In addition to or in lieu of utilizing pads 50 to transfer thermal energy, a heat sink may be thermally coupled to power amplifier 38 at one or more locations (e.g., on the bottom and/or top surface(s) of amplifier 38), which in turn is coupled to antenna 36 for dissipating the thermal energy generated by power amplifier 38. It should also be understood that in addition to, or in lieu of thermally coupling power amplifier 38 to ground portion 48, power amplifier 38 may be thermally coupled directly to active element 46 for heat dissipation thereby. It should be understood that heat generated by other components 54 may be transferred to antenna 36 via ground portion 48 or otherwise.

In operation, antenna 36 functions as a heat exchanger such that vents 42 and 44 (FIG. 1) enable an airflow around antenna 36 for dissipating thermal energy transferred to active element 46 (e.g., preferably, having at least a portion of antenna 36 spaced apart from PCB 34 facilitates a greater surface area of antenna 26 exposed to the airflow to facilitate thermal dissipation thereby). Thus, as a result of the temperature differential between active element 46 and ground portion 48, a thermal flow path 47 is created to transfer the thermal energy carried by ground portion 48 to active element 46 for dissipation thereby. It should be understood that in some embodiments of the present invention, a portion of thermal energy may also be dissipated from ground portion 48 while traveling along thermal flow path 47 toward active element 46 (e.g., as a result of an airflow through vents 42 and 44). Thus, embodiments of the present invention create a thermal energy path 47 from power amplifier 38 and/or other components 54 toward antenna 36 to drive and/or otherwise draw thermal energy toward antenna 36 for dissipation thereby. In the embodiment illustrated in FIGS. 1 and 2, antenna 36 is illustrated as being contained entirely within housing 18 of display member 14. However, it should be understood that antenna 36 may be otherwise configured (e.g., extending at least partially through and/or beyond housing 18 or disposed entirely external to housing 18).

Thus embodiments of the present invention provide dissipation of thermal energy using antenna 36. Thus, for example, embodiments of the present invention facilitate dissipation of thermal energy generated by power amplifier 38 using antenna 36, thereby enabling power amplifier 38 to operate at higher power levels. Additionally, embodiments of the present invention enable power amplifier 38 and/or other components of wireless communication system 10 to be positioned adjacent to and/or in close proximity to antenna 36, thereby facilitating increased performance of the wireless communication system 10.

What is claimed is:

1. A heat-dissipating wireless communication system for a computer device, comprising:
    an antenna configured for wireless communications, the antenna configured to dissipate heat generated by at least one heat-generating component of the computer device, the antenna thermally coupled to the at least one heat-generating component of the computer device;
    at least one vent formed in a housing of the computer device, the antenna positioned within an airflow associated with the at least one vent to draw thermal energy from the at least one heat-generating component via the antenna; and
    a ground portion to transfer the heat to the antenna;
    wherein the heat-generating component is a power amplifier.

2. The system of claim 1, wherein the amplifier is disposed in a display member of a notebook computer device.

3. The system of claim 1, wherein the antenna is configured to dissipate heat generated from at least one component disposed on a printed circuit board (PCB) coupled to the antenna.

4. The system of claim 1, wherein at least a portion of the antenna is disposed in a spaced-apart relationship relative to a PCB coupled thereto.

5. The system of claim 1, wherein the antenna is disposed adjacent the at least one vent.

6. The system of claim 1, further comprising a plurality of vents configured to facilitate an airflow past the antenna.

7. The system of claim 1, further comprising a ground portion of a printed circuit board configured to transfer heat to the antenna.

8. A heat-dissipating wireless communication system for a computer device, comprising:
    means for transmitting radio frequency signals from the computer device, the transmitting means configured to dissipate heat generated by at least one heat-generating means of the computer device, the transmitting means thermally coupled to the at least one heat-generating means of the computer device; and
    at least one airflow means formed in a housing of the computer device, the transmitting means positioned within an airflow associated with the at least one airflow means to draw thermal energy from the at least one heat-generating means via the transmitting means; and
    a ground portion to transfer the heat to the transmitting means;
    wherein the heat-generating means is a power amplifier means.

9. The system of claim 8, wherein the transmitting means is configured to dissipate heat generated from at least one component disposed on a printed circuit board (PCB) coupled to the transmitting means.

10. The system of claim 8, wherein at least a portion of the transmitting means is disposed in a spaced-apart relationship relative to a printed circuit board coupled thereto.

11. The system of claim 8, further comprising the at least one airflow means comprises facilitating an airflow past the transmitting means.

12. A method of manufacturing a heat-dissipating wireless communication system for a portable computer device, comprising:
    providing an antenna within the computer device, the antenna configured to dissipate heat generated by at least one power amplifier component of the computer device;
    thermally coupling the antenna to the at least one power amplifier component of the computer device;
    providing at least one vent formed in a housing of the computer device, the antenna positioned within an airflow associated with the at least one vent to draw thermal energy from the at least one power amplifier component via the antenna; and
    providing a ground portion to transfer the heat to the antenna.

13. The method of claim 12, further comprising disposing the power amplifier in a display member of a notebook computer device.

14. The method of claim 12, further comprising configuring at least a portion of the antenna to be in a spaced-part relationship relative to a printed circuit board coupled thereto.

15. The method of claim 12, further comprising providing the at least one vent in close proximity to the antenna.

16. The method of claim 12, further comprising configuring a ground portion of a printed circuit board to transfer heat to the antenna.

17. The method of claim 12, further comprising providing a plurality of vents configured to facilitate an airflow past the antenna.

* * * * *